United States Patent [19]

Fusaro

[11] 3,920,808

[45] Nov. 18, 1975

[54] METHOD OF PROTECTING HUMAN SKIN FROM ACTINIC RADIATION

[75] Inventor: Ramon M. Fusaro, Omaha, Nebr.

[73] Assignee: Regents of the University of Minnesota, Minneapolis, Minn.

[22] Filed: May 8, 1973

[21] Appl. No.: 358,384

[52] U.S. Cl. .................................................. 424/59
[51] Int. Cl.² .......................................... A61L 23/00
[58] Field of Search .................................... 424/59

[56] References Cited
UNITED STATES PATENTS

| | | | |
|---|---|---|---|
| 3,272,713 | 9/1966 | Runge | 424/59 |
| 3,781,418 | 12/1973 | Pomot et al. | 424/59 |

FOREIGN PATENTS OR APPLICATIONS

| | | | |
|---|---|---|---|
| 881,336 | 11/1961 | United Kingdom | 424/59 |
| 998,152 | 7/1965 | United Kingdom | 424/59 |

OTHER PUBLICATIONS

*British J. Derm.* Vol. 72, (1960), pp. 279–280.

*Primary Examiner*—Frederick E. Waddell
*Attorney, Agent, or Firm*—Laurence, Stokes & Neilan

[57] ABSTRACT

Enhanced protection from sunlight is achieved by applying to human skin beforehand separate, time-spaced applications of (1) a carbonyl compound which is reactive with amino groups in human skin, for example dihydroxyacetone, and (2) a benzo- or naptho-quinone such as lawsone. Preferably several sequential applications of each active component in a separate carrier are made the evening before the first exposure, and protection is thereafter maintained by applying each component separately each evening.

6 Claims, No Drawings

METHOD OF PROTECTING HUMAN SKIN FROM ACTINIC RADIATION

BACKGROUND OF THE INVENTION

The present invention relates to a method for protecting human skin from actinic radiation such as sunlight and the like of wave lengths between about 290 and 2,685 nm. The skin of virtually all persons is sensitive to sunlight to some degree. Many people are extremely sensitive to the extent that they must severely restrict or control their exposure to bright sunlight. The present invention affords a simple and effective method for protecting all persons from the painful effects of overexposure to sunlight. To persons of extreme light sensitivity, the present invention offers a means toward near-normal livelihood.

Various approaches for endeavoring to protect human skin from actinic radiation have been utilized heretofore. One useful prior art approach for protecting human skin is set forth in U.S. Pat. No. 3,272,713 to Runge. This patent discloses a light shield producing material comprising a mixture in a mutual solvent of a benzo- or naphtho-quinone and more particularly alpha and beta tautomers of such quinones and their derivatives capable of 1,4 additions, and a carbonyl containing compound which is reactive with amino derivatives of protein to form melanoidins. The mixture may be applied in the form of an ointment, lotion or the like.

It has been found that formulations in accordance with the Runge disclosure tend to be unstable during storage apparently due to the reaction of the two active components with each other with a consequent loss in efficacy.

SUMMARY OF THE INVENTION

It is a primary object of the invention to provide a novel and effective method for shielding human skin from actinic radiation. Another primary object of the present invention is to utilize the aforementioned active components of the prior art in a method in which the components provide a more effective light shield while avoiding the instability problem mentioned above.

Briefly, the present invention comprises the discovery that advantageous results may be achieved by applying to the skin at timed intervals two separate compositions one of which contains the benzo- or naphtho-quinone active component in a suitable carrier and the other of which contains the effective carbonyl component in a suitable carrier. After applying one of the compositions which is preferably first the composition containing the carbonyl component, this composition is rubbed in, and after waiting for at least about 15 minutes the second composition is applied. This two-step application may be repeated to enhance effectiveness and is preferably repeated several times the evening before first exposure. Thereafter application of both compositions once a day in the evening is usually sufficient to maintain the individual's protection.

This two-step method avoids the prior art instability problem since the two active components are applied separately and, in addition, it has unexpectedly been found that the sequential application of the active ingredients leads to an increase in the protection afforded the skin from actinic radiation as compared to applying to the skin the corresponding amounts of the two active ingredients admixed in a mutual solvent. Test data have shown that following the method of the present invention the period of time to which individuals having severe sensitivity to sunlight may be exposed to the sunlight without harm is increased on the order of 3–4 times as compared to the time of protection afforded by using a mixture of the two active ingredients in a mutual solvent.

The reasons for this increased protection are not fully clear. While it is not intended to be bound by the veracity of any theory, it is presently believed that the increased protection may be due to the application of the carbonyl component reacting with the skin to form sulfhydryl groups on the skin which are available to react with the quinone containing composition which is subsequently applied to the skin. Sulfhydryl groups, which are not normally found to any significant extent on skin since they tend to oxidize upon exposure to air, are known to undergo reactions with quinones.

In the heretofore known case where both active ingredients are applied simultaneously, it is possible that the carbonyl compound and the quinone compound were reacted with each other with the carbonyl compound competing with sulfydryl groups to react with the quinone compound. In that situation there are less sulfhydryl groups available and the carbonyl compound is present in an amount in excess of the sulfhydryl groups. On the other hand when practicing the present invention, it is believed that the carbonyl compound prepares the skin for reception of the subsequently applied quinone compound while the carbonyl compound has its concentration reduced by reaction with the skin prior to application of the quinone containing composition.

The above and other objects, features and advantages of this invention will become more apparent as this description proceeds.

DETAILED DESCRIPTION OF THE INVENTION

In accordance with the present invention enhanced protection from the effects of actinic radiation is achieved by applying to human skin prior to exposure to radiation separate time-spaced applications of (1) a composition containing a carbonyl compound as hereinafter described, and (2) a composition containing a benzo- or naphtho-quinone. It is presently preferred that the compositon containing the carbonyl compound be applied first and thoroughly rubbed in, and thereafter the composition containing the quinone is applied, preferably at least about 15 minutes after the first application.

Exemplary operable carbonyl compounds include dihydroxyacetone (DHA); 5-(hydroxymethyl)-2-furaldehyde (HMF); pyruvic aldehyde; glyceraldehyde; alloxan and monohydroxyacetone (Acetol). These compounds are all reactive with amino derivatives of protein, as present in the human skin, to form melanoidins. They are readily polymerizable. They are tolerable to the skin in that upon application they do not normally cause undue discomfort arising from erythema, itching, burning, etc. for convenience the invention will be described with particular reference to dihydroxyacetone which is the preferred carbonyl compound. The carbonyl containing compounds may be used singly or in admixture with one another.

Useful quinones for carrying out the present invention comprise benzo- or naphtho-quinones, and more particularly alpha and beta tautomers of benzo-and naphtho-quinones and their derivatives capable of 1,4 additions such as juglone (5-hydroxy-1,4-naphthoquinone); menadione (2-methyl-1,4-naphthoquinone); lawsone (2-hydroxy-1,4-naphthoquinone); 2,6-dimethoxybenzoquinone; 2,5-dimethylquinone; 2,5-dihydroxy-3-undecyl-1,4-benzoquinone; 2-hydroxy-3-methyl-1,4-naphthoquinone; 3,5,8-trihydroxy-2-methyl-1,4-naphthoquinone; and 2-hydroxy-3-isobutyl-1,4-naphthoquinone. The presently preferred quinone compound in lawsone since it provides a good tan color, is available in chemically pure form, and is cheaper than, for example, juglone. The quinones may be used singly or in admixture with one another.

Wide variations in concentration of the ingredients in the two compositions are possible. The quinone may be present in the final solution in concentrations from about 0.001% to saturation and the carbonyl containing compound may be present in concentrations from about 1% to saturation. In the case of dilute preparations, more frequent application to the skin is necessary to produce and maintain the desired protective effect. Lawsone is slightly soluble in hot water, freely soluble in chloroform and benzene, soluble in methanol, ethanol and other alcohols, in acetone and ether and the like. Dihydroxyacetone is soluble in water, alcohols, etc. Exemplary solvents include $C_1$ and $C_{10}$ alcohols ranging from dilute alcohols to absolute, glycerin, water, etc., for use in each composition.

The dihydroxyacetone or other carbonyl compound listed above may be present in its composition in a concentration of about 0.1 to 10.0 weight percent, preferably about 0.1 to 6.0 weight percent, with a concentration of about 3.0 weight percent being presently particularly preferred. The quinone compound may be present in its respective carrier composition in a concentration of about 0.1 to 5.0 weight percent. For some of the quinones lower maximum concentrations are used to avoid excessive skin coloring. For example, the maximum concentration for lawsone is about 1.0 weight percent, and the presently preferred concentration is about 0.25 weight percent. The quinone compound and the carbonyl compound may be present in their respective compositions in relative proportions of between about 1:100 and 1:1 on a weight basis and preferably in a ratio of about 1:12.

The carbonyl compound containing composition and the quinone compound containing composition may each be applied directly to the skin in various forms, for example, as a lotion, or when admixed with a hydrophilic cream base, they may be applied as a cream or ointment. Nonoxidizing or nonreducing compounds such as vitamins or hormones, may be admixed without adverse effect upon the light shielding reaction of the compositions with the skin. Depending upon the physical form of the compositions, they may be painted, sprayed or rubbed on the areas to be protected. When the compositions are prepared as creams, any compatible readily available proprietary toilet or cosmetic or medicinal cream base including synthetic cream bases may be used.

The pH of the compositions of the invention may range from about 3.5 to 4.0.

The dihydroxyacetone containing composition and the quinone containing composition are applied alternately with a waiting period between applications. The waiting period is preferably about 15 minutes and may be considerably longer. It will be understood that one application of each composition in sequence constitutes one treatment in accordance with the present invention.

It is presently preferred that the dihydroxyacetone containing composition be applied first. After this composition has remained on the skin for a short period of time, preferably at least about 15 minutes, and presumably during that period of time has commenced reaction with the skin, the quinone containing composition is applied to the skin. This two-step application is repeated at least once and preferably several times the evening before first exposure to the actinic radiation. Thereafter, effectiveness may be maintained in most cases by a single treatment (one application of each composition) once a day in the evening.

The compositions of the invention react with the skin to produce a brown color resembling suntan. This color reaction creates an effective epidermal optical filter which, as part of the skin itself, cannot be removed easily by water, washing with soap, perspiration, or mild mechanical abrasion.

The spectra transmission characteristics of the colored layer produced following application of the two compositions of the invention are significantly different from coloration obtained by either dihydroxyacetone or a naphthoquinone alone, as studied by absorption measurements by spectrophotometric means of the cornified layer of skin.

The preparation and use of the protective light shield producing compositions of the present invention are further illustrated by the following examples.

EXAMPLES 1–16

A clinical study was done with sixteen patients with various types of photosensitivity disease (Table 1). The patients used the following lotions:

| Lotion 1 | Wt. % | Lotion 2 | Wt. % |
| --- | --- | --- | --- |
| DHA | 3 | lawsone | 0.25 |
| polyoxyl 40 stearate | 0.5–5.0 | polyoxyl 40 stearate | 0.5–5.0 |
| stearyl alcohol | 0.5–5.0 | stearyl alcohol | 0.5–5.0 |
| cetyl alcohol | 0.5–5.0 | cetyl alcohol | 0.5–5.0 |
| isopropyl palmitate | 2.5–7.5 | isopropyl palmitate | 2.5–7.5 |
| propylparaben | q.s. | propylparaben | q.s. |
| methylparaben | q.s. | methylparaben | q.s. |
| water | balance | propylene glycol | 2–10.0 |
| | | water | balance |

The patients were instructed to apply in the evening Lotion No. 1 followed 15 minutes later by Lotion No. 2. This was considered one treatment. On each of the first two days the patient gave his skin 3 treatments ½ hour apart. Starting with day 3 until the end of the experiment, each subject used one or two treatments each evening. At the end of the first week, the patient started going out in midday sunlight and increased the amount of sunlight exposure by intervals of not greater than ½ hour every other day. Within three weeks all patients attained the amount of sunlight they could tolerate with protection as noted in Table 2. The results show an increase of 12 fold in the median protection time; that is, prior to protection the median amount of time in sunlight tolerated by the group was 10 minutes but after protection the median time was 120 minutes. The patients continued that protection index for the rest of the study. Table 3 is the evaluation of the degree of protection that the patients felt they had achieved.

In contrast to the present invention's 12-fold increase in median protection time, previous clinical experience using a mixture of 3% DHA and 0.25% lawsone reported in International J. Dermatology 11:67–70, 1972, obtained only about a three-fold increase. Thus, on the basis of clinical results to date, the present invention's separate applications of DHA and lawsone has achieved an approximately 400% improvement over prior clinical experience.

panelist, using exposure times of 5, 10, 15, 20 and 25 seconds.

All test areas were scored for erythema by the following scale:

0 No perceptible erythema
1 Slight erythema

TABLE 1

| Example (Case No.) | Sex | Age | Diagnosis* | Wavelengths of U.V. Photosensitivity** | Duration of Treatment Months |
|---|---|---|---|---|---|
| 1 | F | 67 | PLE | Long–short | 4 |
| 2 | F | 25 | PLE | Long | 7 |
| 3 | F | 27 | PLE | Long–short | 6 |
| 4 | F | 68 | PLE | Long–short | 6 |
| 5 | M | 50 | PLE | Long–short | 2 |
| 6 | F | 41 | PLE | Long | 4 |
| 7 | M | 11 | EPP | Long | 8 |
| 8 | M | 66 | PLE | Sunlight | 3 |
| 9 | M | 18 | EPP | Long | 2 |
| 10 | M | 10 | EPP | Long | 2 |
| 11 | F | 53 | Vitiligo-PLE | Short | 4 |
| 12 | M | 64 | PLE | Long | 4 |
| 13 | F | 38 | Vitiligo | Short | 3 |
| 14 | M | 10 | Albino | Short | 3 |
| 15 | M | 8 | PLE | Sunlight | 4 |
| 16 | M | 4½ | PLE | Sunlight | 4 |

*Ple = polymorphic light eruption (eczema solare); EPP-erythropoietic protoporphyria
**Short = 290–320 nm; long = > 320 nm.

TABLE 2

| Before Protection Sunlight Exposure Time to Produce Symptoms or Eruption | | | After Protection Sunlight Exposure Time tolerated Without Symptoms or Eruption* |
|---|---|---|---|
| TIME Hours | Minutes | Case Number | Case Number‡ |
|  | 5 | 1, 2, 3, 6, 11, 15 | 15† |
|  | 10 | 4, 14, 16 ← MEDIAN | |
|  | 15 | 5, 8, 12 | 5 |
|  | 20 | | |
|  | 25 | | 1 |
|  | 30 | 7, 13 | 8 |
|  | 40 | | 14 |
|  | 45 | 9 | 6 |
| 1 | | | 3 |
| 1½ | | | |
| 2 | | | 2, 7, 13 ← MEDIAN |
| 2½ | | | 11 |
| 3 | 10 | | |
| 4 | | | 4, 9 |
| 6 | | | |
| 8 | | | 10, 12, 16 |

*These values do not represent maximal time of protection in all patients. Some patients did not test the maximal protection achieved by the sunscreen as they were satisfied with the amount of time they could now spend in sunlight.
‡Lines under the Case Numbers indicate the number of applications of the sunscreen per day needed to maintain the sunlight protection.
†This patient received no protection on the face but did achieve 2 to 3 hours of sunlight protection on the extremities.

TABLE 3

| DEGREE OF PROTECTION AS JUDGED BY THE PATIENTS* | |
|---|---|
| Excellent: | 2, 4, 7, 9, 10, 11, 12, 16 |
| Good: | 1, 3, 6, 13, 14 |
| Poor: | 8 |
| None: | 5, 15 |

*Numbers refer to the case numbers of the patients.

The following experiments further demonstrate the greater sunscreen effectiveness of separately-applied lotions versus application of a mixture of the same active components. Three normal female subjects were exposed to a Xenon-Mercury lamp with UV filters to give radiation between 280 and 320nm.

On Day 1, light exposures were made to determine the M.E.D. (Minimal Erythematogenic Dose) for each 2 Moderate erythema
3 Marked erythema
4 Marked erythema and blisters The first applications of the test materials were made on Day 1. Five treatment areas were marked on each thigh of the panelists. These were located so they would be positioned in the exposure areas from the sunlamp.

Preparation and application schedule of the samples were carried out as follows:

Code

1 — Equal amounts of 6% DHA and 0.25% Lawsone mixed just before application.
2 — 3% DHA applied followed by application of 0.125% Lawsone, in 15 minutes. (The above treatment sequence was followed at 30-minute intervals for each treatment.)

A — Three applications at 30-minute intervals on Day 2.

B — Three applications at 30-minute intervals on Day 1 and Day 2.

The above numerical and letter designations were combined for each treatment site on each individual. All panelists were assigned 1A, 1B, 2A and 2B. A fifth site on each panelist was not treated and was designated C. Treatments were made to both legs of all panelists. On Day 2 the MED's were scored. On Day 3 the treated and control sites on one leg of all individuals were exposed to 3 MED's irradiation from the XeM light. The treated areas on the opposite leg were exposed to 6 MED's. The test sites were scored for effects from irradiation on Days 4 and 5.

RESULTS

Individual MED's and scorings following exposures to 3 and 6 MED's from the lamps are shown in Table 4.

TABLE 4

| Panelist No. | MED | Exposure | Scoring | Site - Score | | | | |
|---|---|---|---|---|---|---|---|---|
| | | | | 1A | 1B | 2A | 2B | C |
| 1 | 20 | 60 sec. | Day 4 | 1 | 1 | 2 | 1 | 3 |
| | | " | Day 5 | 3 | 4 | 3 | 2 | 4 |
| 2 | 15 | 45 sec. | Day 4 | 1 | 2 | 1 | 0 | 2 |
| | | " | Day 5 | 1 | 2 | 1 | 0 | 2 |
| 3 | 20 | 60 sec. | Day 4 | 2 | 3 | 2 | 1 | 2 |
| | | " | Day 5 | 2 | 4 | 2 | 2 | 3 |
| 1 | 20 | 120 sec. | Day 4 | 4 | 4 | 2 | 1 | 4 |
| | | " | Day 5 | 4 | 4 | 4 | 2 | 4 |
| 2 | 15 | 90 sec. | Day 4 | 4 | 4 | 1 | 1 | 3 |
| | | " | Day 5 | 4 | 4 | 1 | 0 | 4 |
| 3 | 20 | 120 sec. | Day 4 | 2 | 2 | 2 | 1 | 4 |
| | | " | Day 5 | 2 | 2 | 2 | 1 | 4 |

From Table 4 it will be observed that in general both modes of treatment show improved protection (lower erythema scores) as compared to the untreated control. Moreover, comparing the data of columns 2A with 1A and 2B with 1B, it is evident that the sequential, separate application of the two active components (2A and 2B) provides superior protection to that achieved by using mixtures of the two active components (1A and 1B).

The sunscreening effectiveness of the two treatment modes was also evaluated by determining from Table 4 the total erythemal scores, expressed as percent of the control. Application of the mixture was relatively ineffective at 3MED's exposure, as indicated by scores of 63% (3 applications—3X) and 100% (6 applications—6X); whereas the corresponding values for separately-applied components were 70% (3X) and 37% (6X). A similar advantage of separate application of DHA and lawsone was noted at 6 MED's exposure: 52% (3X) and 26% (6X) versus 87% (3X) and 87% (6X) for the mixture.

It will be appreciated that various changes and modifications may readily suggest themselves to those of ordinary skill in the art upon being apprised of the present invention. For example the active components may be applied in other forms such as an aerosol spray or lotion using a suitable propellant. It is intended to encompass all such changes and modifications as fall within the scope and spirit of the appended claims.

What is claimed is:

1. A method of protecting human skin from actinic radiation comprising applying to the skin prior to exposure to actinic radiation separate applications of effective actinic radiation shielding amounts of (1) dihydroxyacetone and (2) lawsone, each in a suitable carrier, wherein the carrier of one of said compounds is thoroughly rubbed in before the other composition is applied.

2. The method of claim 1, further comprising allowing the carrier of one of said compositions to visibly dissipate, and thereafter applying to the skin the other composition.

3. The method of claim 1, further comprising first applying the composition comprising the said carbonyl compound to the skin.

4. The method of claim 1, wherein said dihydroxyacetone is applied in the carrier at a concentration of 0.1 to 10.0 weight percent, and said lawsone is applied in the carrier at a concentration of 0.1 to 5.0 weight percent.

5. The method of claim 1, wherein said lawsone is present in the carrier at a concentration of 0.1 to 1.0 weight percent.

6. The method of claim 1, further comprising waiting at least about fifteen minutes after applying one of said compositions before applying the other composition.

* * * * *